United States Patent [19]

Parks

[11] Patent Number: 4,688,520

[45] Date of Patent: Aug. 25, 1987

[54] AUTOMATIC ANIMAL FEEDER AND WATER DISPENSER

[76] Inventor: Jack C. Parks, 4001 Visby La., Las Vegas, Nev. 89119

[21] Appl. No.: 833,543

[22] Filed: Feb. 27, 1986

[51] Int. Cl.⁴ ............................................. A01K 5/02
[52] U.S. Cl. ................................ 119/51.11; 119/51.5
[58] Field of Search ............................ 119/51.11, 51.5

[56] References Cited

U.S. PATENT DOCUMENTS

| | | | |
|---|---|---|---|
| 3,527,191 | 9/1970 | Kawecki et al. | 119/51.11 |
| 3,648,660 | 3/1972 | Esquival | 119/51.11 |
| 4,256,054 | 3/1981 | Hitchcock | 119/51.11 |
| 4,421,060 | 12/1983 | Frush et al. | 119/51.5 X |

*Primary Examiner*—Robert Peshock
*Attorney, Agent, or Firm*—Seiler, Quirk & Tratos

[57] ABSTRACT

A device for automatically dispensing animal food at predetermined times and in variable quantities comprises a hopper having a motorized feed auger that is actuated by a timer. The auger dispenses feed to a chute which terminates in a feed bin integral with the device. A water distributor also activated by the timer is used for wetting the food. A water drink-dispenser is also mounted above the feed bin.

1 Claim, 4 Drawing Figures

AUTOMATIC ANIMAL FEEDER AND WATER DISPENSER

BACKGROUND OF THE INVENTION

This invention relates to apparatus for feeding animals automatically, and for providing portions of fresh water for animals to drink, when the owners are absent. More particularly, it relates to a device for storing animal feed in a hopper and dispensing preselected quantities of feed at preselected times automatically. Also provided is an animal-actuated water dispenser which dispenses only the amount of water needed by the animal.

On many occasions, an owner may wish to leave a pet at home for a weekend, or a longer period of time, during trips away from home. On these occasions, the owner wishes to have assurance that the pet or pets will be properly fed, and that fresh water is available to the pet upon demand. The present invention provides an automatic feeding device which dispenses quantities of food which may be preselected by simply turning a knob. In addition, the food may be dispensed on a daily basis or more frequently, the frequency being changeable by a simple clock setting. An owner has the option of dispensing the food dry, or of wetting the food with fresh water as it enters the feed bin. The animal also has fresh water available for drinking at any time, and the water is dispensed by an animal drinker that dispenses only the quantity desired. The unit is completely self contained, and no other dishes or vessels are required.

In the past, a variety of automatic animal feeders have been designed, although none of these devices have the features of applicant's apparatus. For example, Steinberg, U.S. Pat. No. 735,167 appears to be the first example of an electrically operated dispenser having a rotatable hopper for dispensing feed. A similar device is disclosed in Arvizu, U.S. Pat. No. 4,279,221. Shay, U.S. Pat. No. 4,235,200 discloses an automatic feeder having a single pivoting food delivery chamber which oscillates back and forth between a fill position and a dispensing position. A manually operated feeder is found in Meyer, U.S. Pat. No. 4,522,152.

A self-contained device having a rotatable bin for dispensing solid food and a water tank having a submerged pump from which water may be dispensed is disclosed in U.S. Pat. No. 3,648,660. A similar machine is disclosed in Lopez, U.S. Pat. No. 3,741,162; the Lopez device holds drinking water in an external dish, with the level being maintained by an inverted bottle mounted over the dish. The Lopez device requires feed and water dishes to be maintained outside of the unit. None of the prior art devices has the combination and convenience of features offered by applicant's apparatus.

Accordingly, it is an object of the invention to provide an automatic pet feeder which dispenses desired quantities of food at preselected intervals in the absence of an owner. It is another object of the invention to provide an automatic feeding apparatus which may also be used to add fresh water to the animal feed at the time the feed in dispensed. It is yet another object of the invention to provide an automatic animal feeder having a drink dispenser which is actuatable by the animal, thus dispensing only the amount of water desired. These and other objects of the invention are accomplished by the device which is described in the following description of the preferred embodiment of the invention.

SUMMARY OF THE INVENTION

An automatic animal feeder comprises a feed hopper and a feed chute mounted in a housing along with a conduit therebetween in which a rotatable screw feed or auger is mounted. An electric motor attached to various timers actuates the feed screw at preselected times and for a preselected duration, said selections being made by timer settings. A water conduit is connected to a source of pressurized water (such as municipal water), and conducts water to a feed wetter mounted in the housing above the chute and to an animal-actuated drinking valve.

BRIEF DESCRIPTION OF THE DRAWINGS

The invention is best understood with reference to the drawings, in which.

DETAILED DESCRIPTION OF A PREFERRED EMBODIMENT

Figure 2:
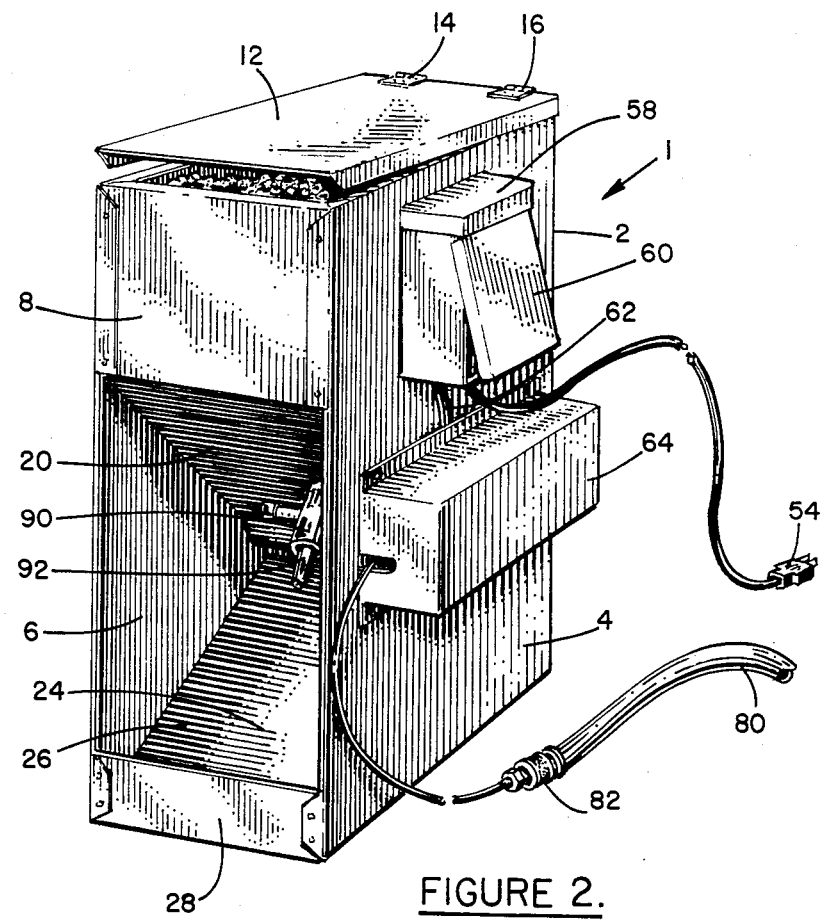
FIG. 2 is a perspective view of the animal feeder of the invention.

Referring first to FIG. 2 of the drawings, the automatic animal feeder 1 of the invention has an external housing 2 comprised of side panels 4 and 6, front panel 8, rear panel 10, and bottom panel 11. Generally speaking, these are relatively thin galvanized sheet metal panels having sufficient structural stability to support the housing, but may be made out of other materials such as plastic. A hinged lid 12 mounted on the rear panel 10 by hinges 14 and 16 allows access to a feed hopper 18 at an upper portion of the interior of the housing.

Figure 3:
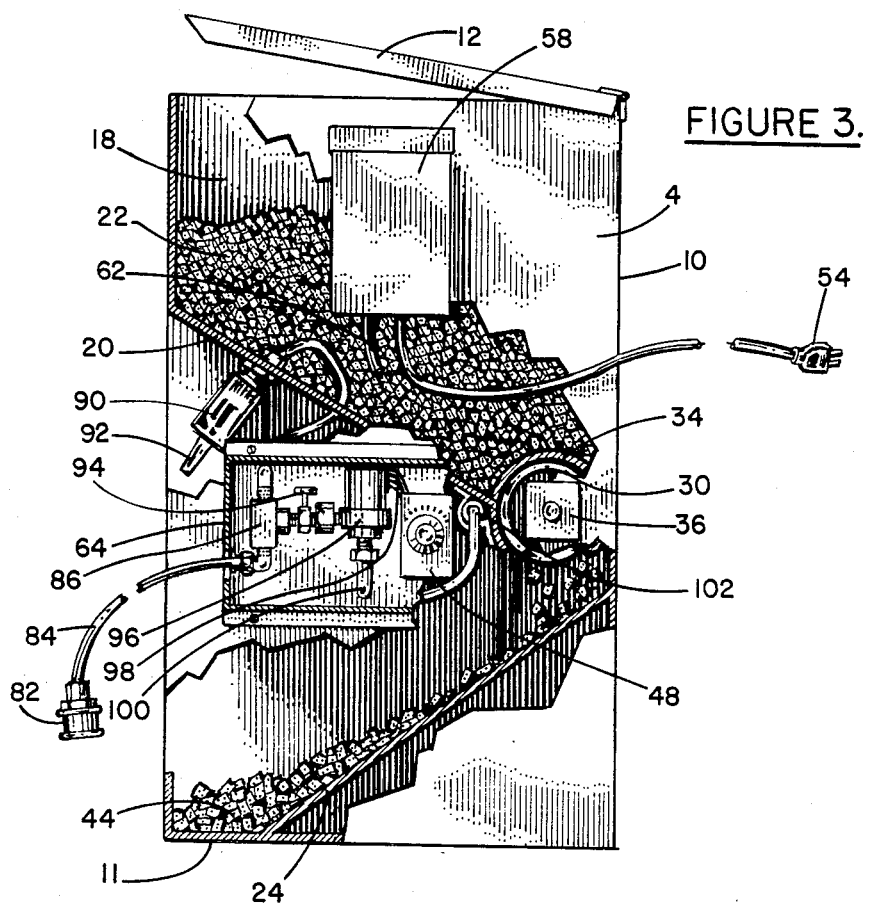
FIG. 3 is a partially sectioned side elevational view of the feeder of the invention.
Figure 4:
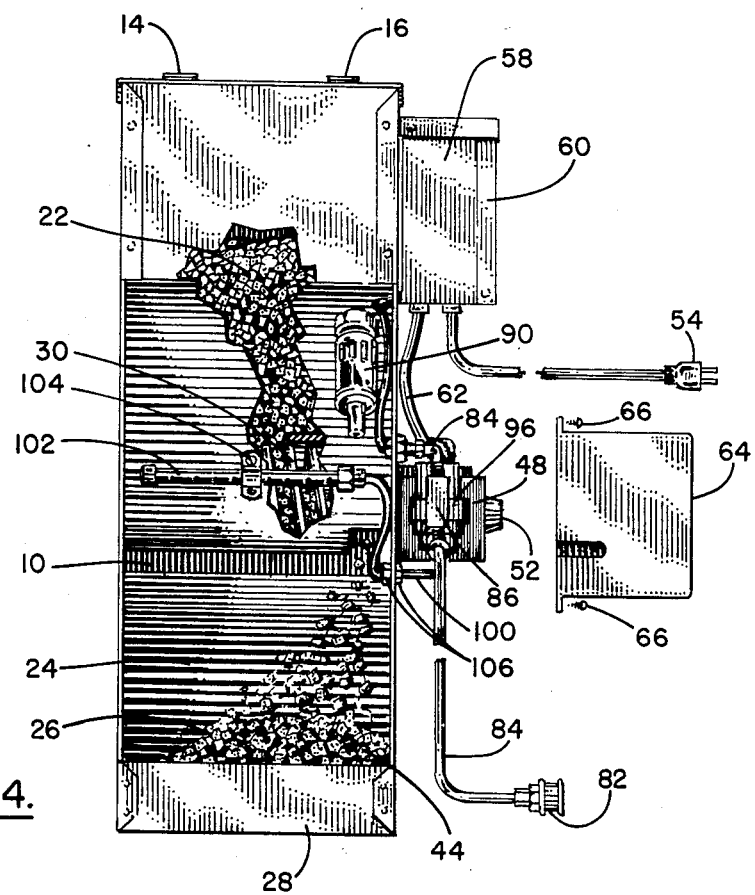
FIG. 4 is a front elevational view, partially sectioned, of the device.

As best seen in FIGS. 3 and 4, the feed hopper 18 is formed by the housing walls and a hopper floor 20 which slopes downwardly toward the rear of the housing. Dry food 22 is poured into the hopper through the opening in the top of the housing. Food is dispensed from the hopper through an opening 42 in the hopper floor at the rear of the housing onto an inclined chute 24. Food descends down the chute into a feeding chamber or portion-retaining bin 26 which is defined by a front lip or panel 28 at a front bottom portion of the housing, and by side walls 4 and 6 and the chute surface 24. This feeding bin acts as a bowl, and no further portion-retaining device or dish is necessary with the use of the device of the invention. If desired, the portion-retaining section of the device may be lined e.g., with a plastic liner to preclude leakage or corrosion.

Figure 1:
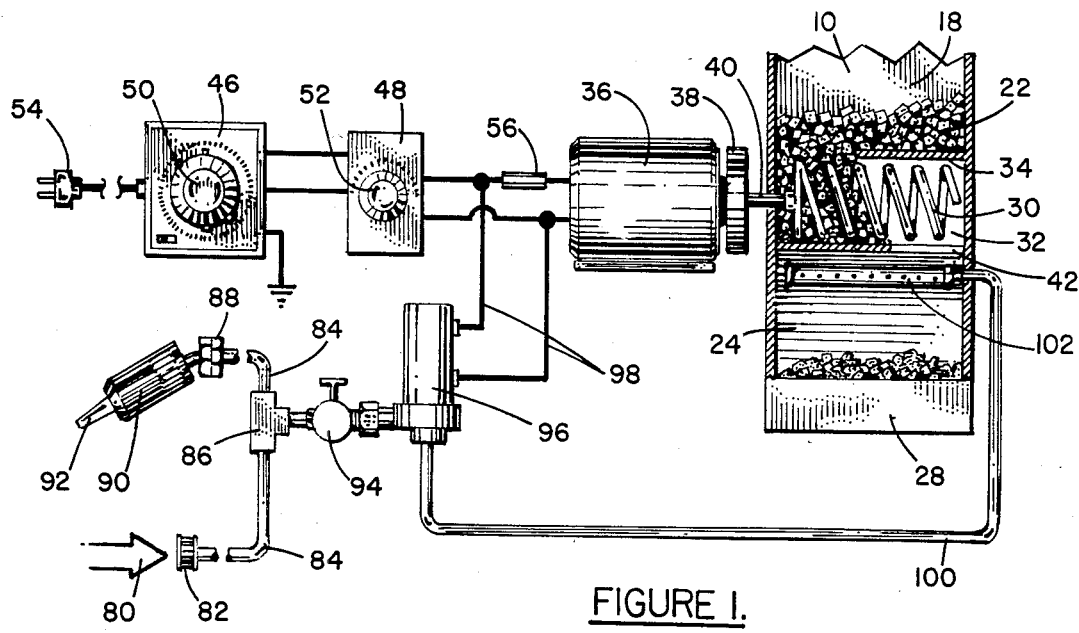
FIG. 1 is a schematic view of the animal feeder of the invention, showing the principal operating parts thereof.

Delivery of the solid food portions from the hopper to the feed bin is effectuated by use of a helical auger or screw 30 which is housed within a cylindrical coil chamber 32 formed by a coiled shield 34. As best seen in FIGS. 1 and 3, an electrical motor 36 having a gear 38 drives a shaft 40 which is attached to the auger. The auger is simply a helically coiled rigid metal element which is mounted on the end of the motor shaft and which, when turned, advances food from the feed hopper through the coiled chamber to the opening 42 in the hopper floor, where the feed then drops onto the chute. Food then drops down the chute and is retained at 44 for access by the animal. In larger units, it may be desirable to secure the free end of the auger in a bushing mounted on the interior of side panel 4 to prevent wobbling.

The electrical control system for the screw-feed is shown schematically in FIG. 1. A conventional electric motor 36 is used to drive the auger. These motors are readily commercially available; an example of a suitable motor is a 12 rpm motor manufactured by Dayton Electric Manufacturing Co., Chicago, Illinois, Model No. 27807. Power is supplied to the unit from a conventional 110V power source through a male plug 54 which is connected in series through timing means consisting of a timer 46 and a time delay relay 48. A fuse 56 is also mounted in series in the electrical line. The motor ground connection (not shown) should be grounded to the housing, and a three-prong electrical plug should be used for safety. The timer 46 is also a commercially available unit which can be preset to switch power to the motor on and off according to the desired times of feeding the animal. A suitable example timer which may be used in connection with the invention is Dayton All Weather Timer Model 5×423, also available from Dayton Electric Manufacturing Co. For outside use, the timer may be mounted away from or interior of the machine, or a waterproof casing may be used. The timer has a time dial 50 for setting the time, and an on-off switch 51 for actuating the unit manually. The timer is connected in series by cable 62 to a time delay relay 48. This relay is an interval timer which controls the duration of time for which the auger feed screw operates. Upon application of voltage to the input terminals of the relay, the output contacts transfer and a time delay period begins. At the end of the time delay period, the contacts transfer back, thereby disconnecting the motor. Reset is accomplished by removing input voltage. A suitable commercially available time delay relay is Dayton Model 5×829C, which has the feature of a continuous variable time interval operation of from 1.8 to 180 seconds. Setting of the interval is accomplished simply by turning the dial 52 to the desired time interval. Accordingly, an owner can select the size of portion to be dispensed from the hopper simply by setting the time delay relay to operate for a period of time necessary to dispense the desired portion size. With the combined settings of the timer and time delay relay, an owner may dispense a single large portion once a day, or may dispense smaller portions several times a day. The Dayton time delay relay is also manufactured by Dayton Electric Manufacturing Co.

The timer 46 is mounted on side panel 4 of the feeder as shown in FIGS. 2–4, and is enclosed within timer housing 58 having a hinged lid 60 permitting access to the timer setting. The motor, time delay relay, and water delivery fittings are also mounted on side panel 4 and are enclosed by a cover 64 mounted on the side panel with screws 66 (see FIG. 4).

The device of the invention provides water to be supplied both to wet the animal's food, if desired, and to permit the animal to drink fresh water at will. The water supply system is shown schematically in FIG. 1. A source of water, such as a municipal water supply, is attached by a hose fitting 82 to supply tubing 84. The tubing connects through a tee 86 and fittings 88 to an automatic water 90 having a tongue portion 92. The tongue portion is a biased lever arm which actuates a valve internal to the drink-dispensing means 90; the valve is in a normally closed position but opens when the lever arm 92 is moved. Water released through the valve runs down the external cylindrical surface of the tongue, where it is readily accessible to the animal. The animal nudges the lever arm with its mouth, thereby obtaining water to drink. Animals are easily trained to use drink-dispensing means of this type. These devices are commercially available; an example of a suitable device for use in the invention is marketed by Con Agra Pet Products Co. of Omaha, Nebraska under the name "Thirst Quencher", and is described in U.S. Pat. No. 2,939,424. The drink-dispensing means 90 is mounted at a downward angle from panel 20 as shown in FIG. 3; mounting of the dispenser in the interior of the feeding bin ensures that any water which is spilled during the drinking process falls into feeding bin 26 where it is retained. The angle of mounting the waterer may be varied depending on the type and size of waterer used.

Water from the supply conduit 84 also passes through the tee to food wetting means 102 which consists of a horizontally mounted pipe having holes drilled therein to spray water on the food 44 resting in the bin 26. The spray pipe is mounted by means of a clamp 104 on panel 20 in the feeding chamber. As best seen in the schematic diagram of FIG. 1, the dispenser 102 is connected by conduit tubing 100 to the water source through a hand-operated valve 94 and an electrically operated solenoid valve 96. The solenoid is electrically connected through wires 98 to the time delay relay, thus being actuated for the same amount of time as the feed auger. The manual valve 94 permits an owner to shut off the water in the event that the animal's food is to be served dry. The water supply apparatus is mounted on side panel 4 as best seen in FIG. 3; fittings 106 are used to secure the tubing 100 as it passes through side panel 4 to the dispensing device (see FIG. 4).

Use of the dispenser of the invention is very simple. Dry feed is poured into the feed hopper through the opening at the top of the device. The timer 46 is set to go on and off at the desired time or times of day. The knob 52 on the time delay relay is set for the specific time necessary to dispense the desired quantity of food; this time is generally determined by trial and error. The water supply conduit is connected to a hose, thereby actuating the water dispenser 90. If it is desired that the food be served wet, valve 94 is also opened. The degree of wetness may be controlled by the extent to which manual valve 94 is opened. Once the feeder is set, the food and water will be automatically dispensed in accordance with the setting as heretofore described.

The invention has of course been described with respect to a specific embodiment thereof, but it will be obvious to those skilled in the art that changes and modifications may be made without departing from the invention in its broader aspects. Accordingly, the specific embodiment described should be considered illustrative rather than limiting, and the invention should be limited only by the following claims.

I claim:

1. An automatic animal feeding device comprising a housing, a feed hopper located in an upper portion of the housing, a feed chute located in a lower portion of the housing terminating in a portion-retaining bin, conduit means for passing feed from the hopper to the chute, rotatable screw feed means having a horizontal axis mounted in the conduit means, an electric motor operatively connected to the rotatable screw feed means, timer means electrically connected to the motor for actuating the motor at a preselected time, variable adjustment means for selectively varying the duration of actuation of the rotatable screw feed means, water distribution means mounted above the portion retaining bin for applying water to feed located in the portion retaining bin, connecting means for removably attaching the water distribution means to a pressurized water source, first electrically operated valve means intermediate the water distribution means and the pressurized water source, second manually operated valve means intermediate the water distribution means and the pressurized water source, drink dispensing means mounted directly above the portion-retaining bin for dispensing portions of water for an animal to drink, water conduit means for conducting water from the pressurized water source to the drink dispensing means, said drink-dispensing means including an animal-operated actuating means for releasing water from the drink-dispensing means comprising a valve having a biased lever actuating arm movable between a normally closed position and an open position in which water is released along the lower arm by an animal.

* * * * *